United States Patent [19]
Baumann et al.

[11] Patent Number: 5,938,239
[45] Date of Patent: Aug. 17, 1999

[54] MOTOR VEHICLE STEERING COLUMN ASSEMBLY UNIT

[75] Inventors: Janet Baumann, Diepholz; Burkhard Schäfer, Ganderkesee, both of Germany

[73] Assignee: Lemforder Metallwaren AG, Stemwede-Dielingen, Germany

[21] Appl. No.: 08/932,209

[22] Filed: Sep. 17, 1997

[30] Foreign Application Priority Data

Sep. 19, 1986 [DE] Germany .......................... 196 38 316

[51] Int. Cl.$^6$ ..................................................... B62D 1/16
[52] U.S. Cl. ........................................... 280/777; 280/779
[58] Field of Search ..................................... 280/777, 779

[56] References Cited

U.S. PATENT DOCUMENTS 4,241,937 12/1980 Eggen et al. ............................ 280/777
5,390,955 2/1995 Kaliszewski et al. ................... 280/777
5,425,553 6/1995 Yazane et al. .......................... 280/777
5,470,107 11/1995 Müntener et al. ...................... 280/777

FOREIGN PATENT DOCUMENTS 74 36 144  2/1975  Germany .

*Primary Examiner*—Kenneth R. Rice
*Attorney, Agent, or Firm*—McGlew and Tuttle, P.C.

[57] ABSTRACT

A self-positioning motor vehicle steering column assembly unit is described, which can be quickly assembled, has a steering column, a steering column connection frame, a connection bracket fixed on the vehicle side, and at least one fastening device for fixing the steering column frame to the connection bracket, wherein the fastening device has at least two fastening elements that can be screwed to one another, between which a deformable spacer sleeve is arranged, wherein at least one opening, which comprises two partial areas of different size, is provided in the connection bracket.

10 Claims, 3 Drawing Sheets

MOTOR VEHICLE STEERING COLUMN ASSEMBLY UNIT

FIELD OF THE INVENTION

The present invention pertains to a motor vehicle steering column assembly unit, which has a steering column, steering column connection frame, a connection bracket fixed to the vehicle, and at least one fastening means for fixing the steering column connection frame to the connection bracket, wherein the fastening means has at least two fastening elements that can be screwed to one another.

BACKGROUND OF THE INVENTION

Such steering column assembly units of this class are used in both passenger cars and trucks. During the manufacture of the motor vehicles, the steering column is assembled in the usual manner such that the steering column connection frame is fastened to the vehicle-side connection bracket, which may comprise a crossbeam, a frame section or a similar component, by means of bolts, nuts, washers and other components of this type. The assembly is divided into individual process steps. The steering column is first prepositioned in the vehicle, after which a preassembly of the above-mentioned bolts and nuts is performed, and the final tightening of the screw connection is then finally performed after the final alignment of the steering column by the support of appropriate tools, wherein predefined tightening torques are to be observed.

Such an assembly of the steering column is time-consuming and therefore cost-intensive due to the different consecutive process steps. In addition, there is a drawback, namely, that as supplied for the final assembly, the steering column assembly unit comprises individual assembly units, e.g., the steering column and the individual screw connections, which increases the necessary storage and logistic efforts.

SUMMARY AND OBJECTS OF THE INVENTION

The object of the present invention is therefore to improve a motor vehicle steering column assembly unit of this class such that the effort needed for assembling such assembly units is considerably reduced, the assembly as a whole is simplified, and the stocking as well as the logistic efforts for the motor vehicle steering columns are reduced.

The object is accomplished according to the present invention by a deformable spacer sleeve being arranged between the fastening elements of the motor vehicle steering column assembly unit to be screwed together and by openings, which comprise two partial areas of different size, being provided in the connection bracket.

The installation of a spacer sleeve in the fastening means makes it possible to preassemble the fastening means on the steering column connection frame already before the final assembly. The steering column with the screw connection prepared needs only to be suspended by the assembler into the corresponding connection bracket on the motor vehicle. It is achieved due to the special design of the openings in the connection bracket that the steering column will be automatically positioned in a predetermined, correct position during the suspension of the steering column. Thus, only a final tightening of the screw connection needs to be finally performed with a suitable tool.

The time required for the assembly of the motor vehicle steering column assembly unit is consequently decisively reduced by the design according to the present invention, and the logistic effort is reduced. Handling during assembly is facilitated by the prepositioning of the steering column, and errors in assembly are ruled out.

Additional advantageous embodiments of the subject of the present invention appear from the features of the subclaims. It has proved to be particularly advantageous for the two partial areas of the openings of the connection bracket to be designed such that one partial area has a round cross section, whose diameter is larger than the external diameter of the fastening elements, and that the second additional partial area in the form of a U-shaped cross section joins the first partial area, wherein the dimension between the two parallel legs of the U is smaller than the external diameter of the fastening elements. During the assembly of the motor vehicle steering column assembly unit, one side of the fastening elements preassembled on the steering column connection frame is pushed through the larger partial area of the opening to the extent that the spacer sleeve located between the fastening elements is located in the opening. By lowering the steering column, the spacer sleeve is then introduced into the U-shaped partial area of the opening of the connection bracket. Due to its elastic properties, the spacer sleeve is deformed corresponding to the outer contour of this second partial area, and thus it ensures the final, correct positioning of the steering column. Moreover, the elastic properties of the spacer sleeve are able to compensate, within a certain range, the tolerances that may arise from the arrangement of the openings in the connection bracket.

The necessary elastic properties of the spacer sleeve can be achieved in a simple manner by manufacturing the spacer sleeve from a plastic. In addition, it is, of course, also conceivable to manufacture the spacer sleeve from other elastic materials, e.g., rubber.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
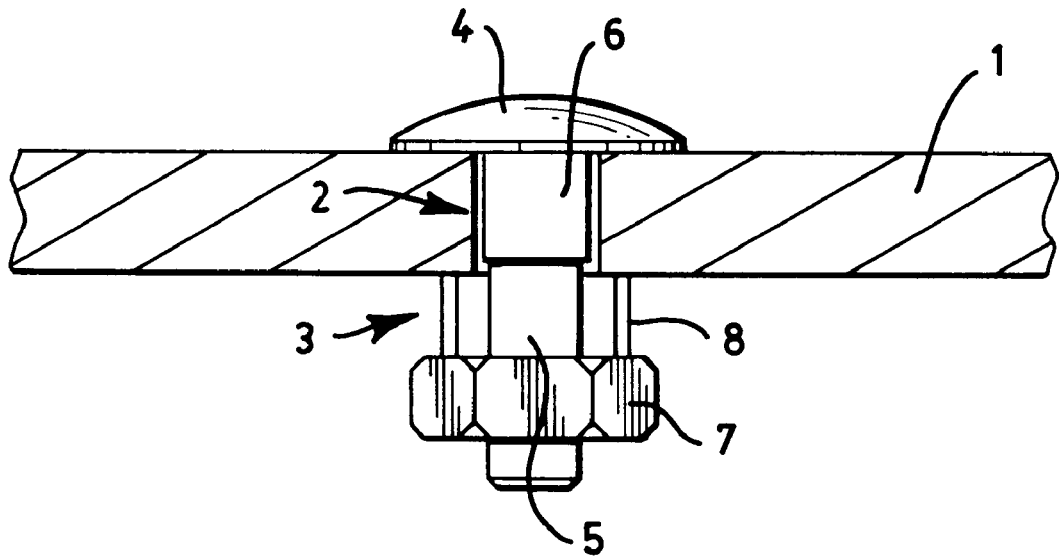
FIG. 1 shows a partial area of the steering column connection frame with a preassembled fastening means.
Figure 4:
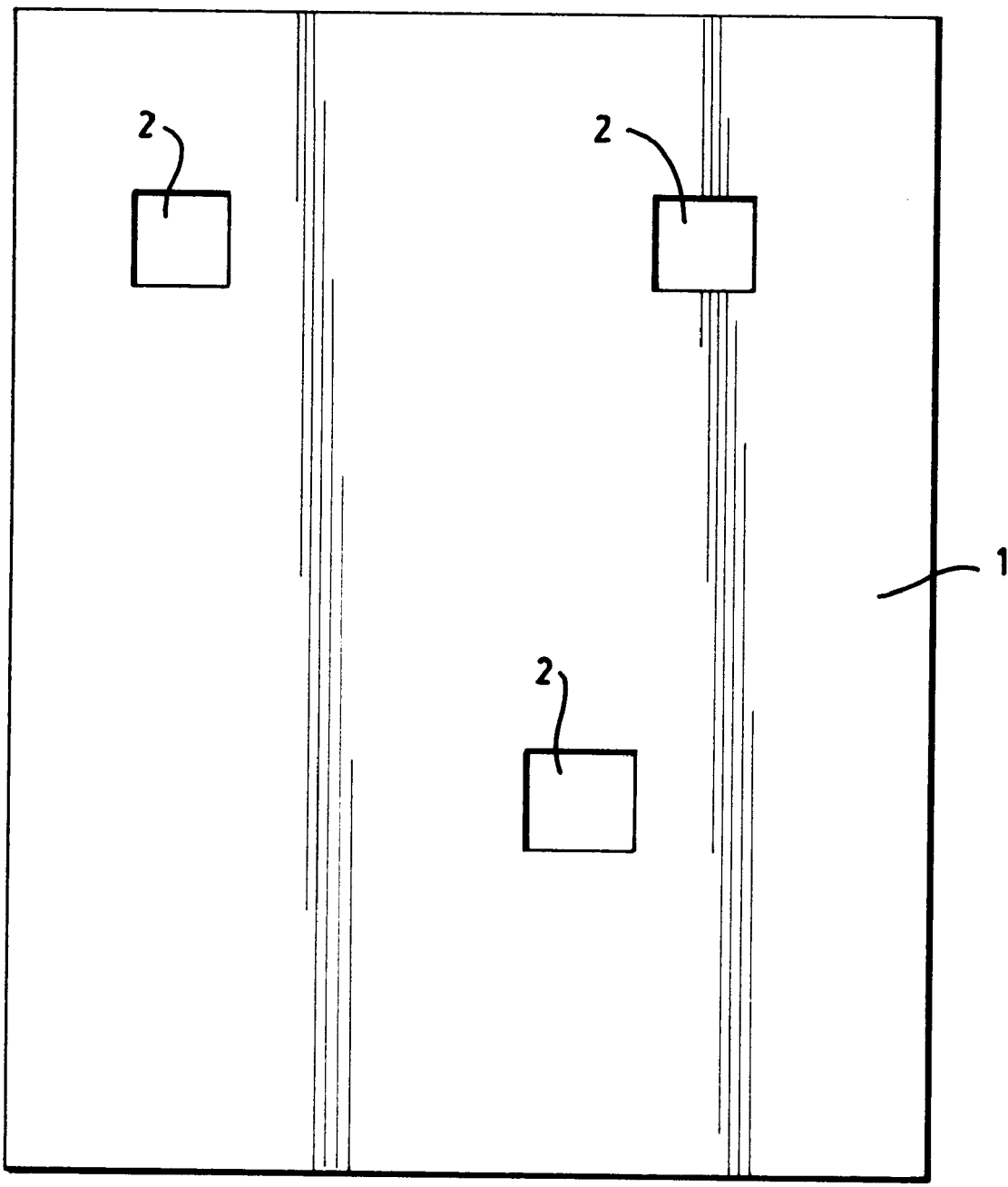
FIG. 4 is a view of the steering column connection frame of the motor vehicle steering column assembly unit before the assembly of the fastening means.

Referring to the drawings and in particular to FIG. 1, the steering column connection frame or first bracket 1 of the motor vehicle steering column assembly unit, which is shown as a sectional view in FIG. 1, comprises a sheet metal structure and has three square openings 2 in this exemplary embodiment. The arrangement of the square openings 2 appears from the view of the steering column connection frame in FIG. 4. The arrangement is selected to be such that a tension-free three-point bearing is obtained after the assembly of the steering column.

The fastening means 3 is formed of a shaft and button element. The shaft is preferably a mushroom-head square neck bolt 4, also know as a carriage bolt, in which a square neck 6 is located between a threaded part 5 and a bolt head. For assembling the fastening means 3 is inserted into the opening 2. In conjunction with the shape of the opening 2, the square neck prevents the mushroom-head square neck bolt 4 from rotating.

FIG. 1 also shows that the fastening means 3 additionally has the button element formed as a hexagon nut 7, and that the fastening means includes a spacer sleeve 8. The spacer sleeve is arranged between the hexagon nut 7 and the wall of the steering column connection frame 1 and its length is selected to be such that it approximately corresponds to the thickness of the wall of the connection bracket 9, to which the steering column connection frame 1 and the entire steering column is to be fastened. Due to its elasticity, the spacer sleeve 8, which is preferably made of a plastic, exerts a slight pressing force on the hexagon nut 7 after screwing to the mushroom-head square neck bolt 4. This slight pressure prevents the fastening means 3 from loosening during the transportation of the motor vehicle steering column to its place of final assembly.

Figure 3:
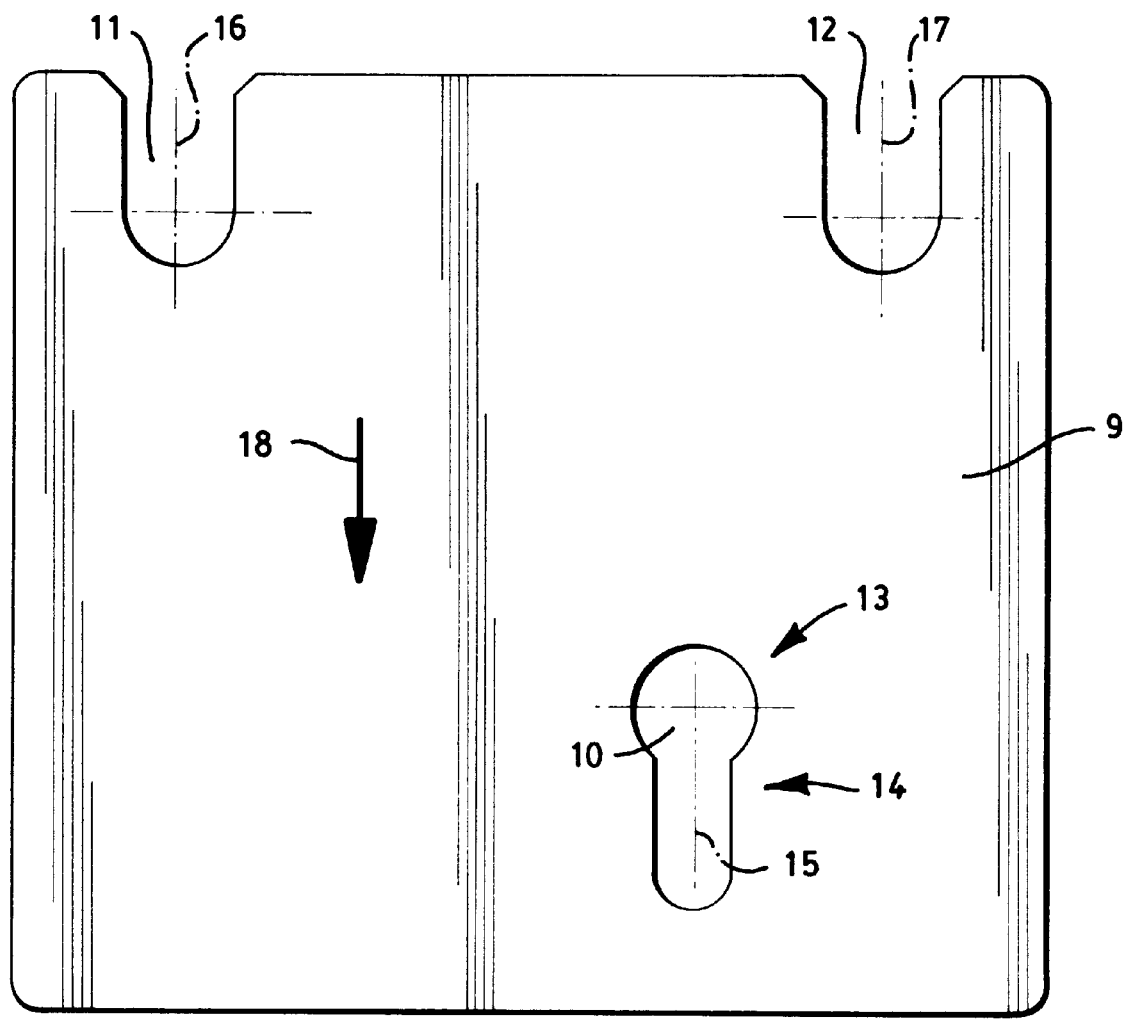
FIG. 3 is a view of the vehicle-side connection bracket with the openings provided for passing through and fastening the fastening means.

During final assembly, the steering column connection frame 1 with the three preassembled fastening means 3 is brought into contact with the front side of the connection bracket 9. As is shown in FIG. 3, an opening 10 as well as two U-shaped recesses 11 and 12 open toward the side wall are located in the connection bracket 9. The opening 10 has a partial area 13 of circular cross section, whose diameter is selected to be such that it is slightly larger than the external diameter of the hexagon nut 7, which is to be passed through that opening during the final assembly of the steering column connection frame.

The partial area 13 of the opening 10 is joined by another partial area 14, which has a U-shaped cross section. The center line 15 of this partial area is aligned in parallel to the center lines 16 and 17 of the recesses 11 and 12. The distance between the parallel side walls of this partial area 14 is smaller than the external dimension of the hexagon nut 7 and also smaller than the external diameter of the spacer sleeve 8.

After the steering column connection frame 1 has been brought into contact with the connection bracket 9, the entire steering column is lowered in the direction of the arrow 18 in FIG. 3.

Figure 2:
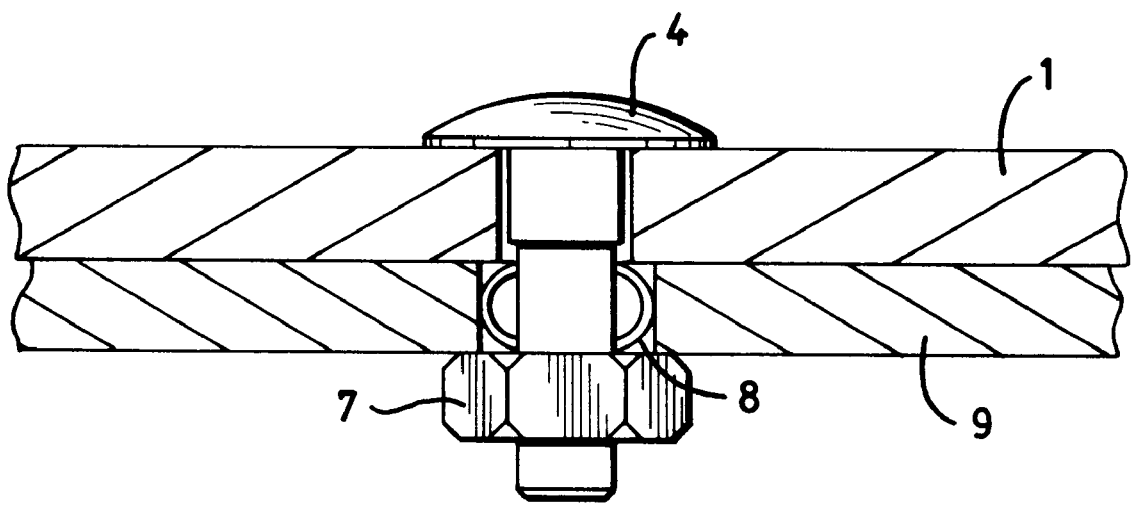
FIG. 2 shows the detail of the steering column connection frame after the final assembly on the vehicle-side connection bracket.

FIG. 2 shows that the spacer sleeve 8 is squeezed together because of the narrow cross section of the partial area 14 of the opening 10, and it fixes the entire steering column in its predetermined place. Once the steering column connection frame and the connection bracket have thus assumed their final positions in relation to one another, the final fixing of the fastening means is performed with a predetermined tightening torque.

A complicated alignment of the assembly unit, which was previously usual, is eliminated due to the deformation of the spacer sleeve 8 in the opening 10 and the associated positioning of the steering column. In addition, the spacer sleeve ensures a certain compensation of tolerances, which is sometimes necessary due to the fact that the openings provided in the steering column connection frame 1 and the openings 10 and recesses 11 and 12 present in the connection bracket 9 are not exactly aligned. Complicated finishing measures of the openings are thus eliminated.

The automatic positioning of the steering column assembly unit at the connection bracket 9 may additionally have the advantage that additional workers are unnecessary within the framework of a one-man/one-hand assembly.

While specific embodiments of the invention have been shown and described in detail to illustrate the application of the principles of the invention, it will be understood that the invention may be embodied otherwise without departing from such principles.

LIST OF REFERENCE NUMBERS

| List of Reference Numbers: |  |
|---|---|
| 1 | Steering column connection frame |
| 2 | Opening |
| 3 | Fastening means |
| 4 | Mushroom-head square neck bolt |
| 5 | Threaded part |
| 6 | Square neck |
| 7 | Hexagon nut |
| 8 | Spacer sleeve |
| 9 | Connection bracket |
| 10 | Opening |
| 11 | Recess |
| 12 | Recess |
| 13 | Partial area |
| 14 | Partial area |
| 15 | Center line |
| 16 | Center line |
| 17 | Center line |
| 18 | Arrow |

What is claimed is:

1. A motor vehicle steering column assembly unit comprising:

a first bracket connected to one of a steering column and motor vehicle receiving said steering column;

fastening means extending from said first bracket, said fastening means including a first element and a second element movable along said first element;

a second bracket connected to the other of said steering column and said motor vehicle, said second bracket being fastenable to said first bracket by said fastening means, said second bracket defining an opening with first and second partial areas of different sizes;

deformable spacer sleeve arranged between said first and second elements of said fastening means.

2. A motor vehicle steering column assembly unit in accordance with claim 1, wherein:

said first partial area of said opening has a round cross section with a diameter larger than a diameter of said first and second elements of said fastening means;

said second partial area of said opening has a U-shaped cross section joining said first partial area, a distance between legs of said U-shaped cross section being smaller than an external diameter of said fastening means.

3. A motor vehicle steering column assembly unit in accordance with claim 1, wherein:

said spacer sleeve is made of a plastic.

4. A motor vehicle steering column assembly unit in accordance with claim 1, wherein:

said first element of said fastening means is a shaft and said second element is a button element movable along said shaft;

said second bracket has a thickness;

said deformable spacer sleeve is arranged on said shaft between said first bracket and said button element, said sleeve spacing said button element from said first bracket by a distance equal to or greater than a thickness of said second bracket, said sleeve being collapsible when said button element moves along said shaft to fasten said second bracket to said first bracket.

5. A motor vehicle steering column assembly unit in accordance with claim 1, wherein:

said first and second fastening elements screw together.

6. A motor vehicle steering column assembly unit in accordance with claim 1, wherein:

said first bracket is connected to said steering column and said second bracket is connected to said motor vehicle.

7. A motor vehicle steering column assembly unit in accordance with claim 4, wherein:

said spacer positions said shaft in a predetermined position in said opening.

8. A motor vehicle steering column assembly unit in accordance with claim 4, wherein:

said opening is larger than said shaft and smaller than said button element.

9. A motor vehicle steering column assembly unit in accordance with claim 4, wherein:

said first partial area of said opening is larger than said button element and said second partial area of said opening is smaller than said button element.

10. A motor vehicle steering column assembly unit in accordance with claim 4, wherein:

a plurality of said fastening means extends from said first bracket;

said second bracket defines a plurality of additional openings for receiving said shafts of said plurality of fastening means, said plurality of openings receiving said shafts with respective attached button elements and positioning said steering column in a predetermined position in said motor vehicle for final tightening of said fastening means.

* * * * *